(12) United States Patent
Lee et al.

(10) Patent No.: US 7,158,777 B2
(45) Date of Patent: Jan. 2, 2007

(54) AUTHENTICATION METHOD FOR FAST HANDOVER IN A WIRELESS LOCAL AREA NETWORK

(75) Inventors: Kyung-Hee Lee, Suwon-shi (KR); Maeng-Hee Sung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 287 days.

(21) Appl. No.: 10/682,237

(22) Filed: Oct. 9, 2003

(65) Prior Publication Data

US 2004/0077335 A1    Apr. 22, 2004

(30) Foreign Application Priority Data

Oct. 15, 2002    (KR)    ...................... 10-2002-0062994

(51) Int. Cl.
*H04M 1/66*    (2006.01)

(52) U.S. Cl. ...................................... 455/411; 455/410

(58) Field of Classification Search ................ 455/436, 455/411, 410; 713/169, 170, 161; 380/247, 380/248

See application file for complete search history.

(56) References Cited

U.S. PATENT DOCUMENTS

| | | | | |
|---|---|---|---|---|
| 6,148,404 | A * | 11/2000 | Yatsukawa | 726/2 |
| 6,370,380 | B1 * | 4/2002 | Norefors et al. | 455/436 |
| 6,771,776 | B1 * | 8/2004 | Rose | 380/272 |
| 6,876,747 | B1 * | 4/2005 | Faccin et al. | 380/247 |
| 2002/0138635 | A1 * | 9/2002 | Redlich et al. | 709/229 |
| 2002/0174335 | A1 * | 11/2002 | Zhang et al. | 713/168 |
| 2004/0068668 | A1 * | 4/2004 | Lor et al. | 713/201 |
| 2004/0088550 | A1 * | 5/2004 | Maste | 713/182 |
| 2004/0098588 | A1 * | 5/2004 | Ohba et al. | 713/169 |
| 2004/0103282 | A1 * | 5/2004 | Meier et al. | 713/171 |

FOREIGN PATENT DOCUMENTS

| | | |
|---|---|---|
| WO | WO 01/39538 | 5/2001 |
| WO | WO 02/21768 | 3/2002 |

OTHER PUBLICATIONS

European Search Report dated Feb. 5, 2004 issued in a counterpart application, namely, Appln. No. 03078244.5.
V. Bharghavan, "Secure Wireless LANs", University of California at Berkeley, 1994, pp. 10-17.

* cited by examiner

*Primary Examiner*—Duc M. Nguyen
*Assistant Examiner*—Wayne Cai
(74) *Attorney, Agent, or Firm*—The Farrell Law Firm (57) ABSTRACT

Disclosed is a method for authenticating a mobile node in a wireless local area network including at least two access points and an authentication server. When the mobile node associates with a first access point and performs initial authentication, the mobile node receives a first session key for secure communication from the authentication server by using a first private key generated with a secret previously shared with the authentication server, and the first access point receives the first session key from the authentication server by using a second private key previously shared with the authentication server. When the mobile node is handed over from the first access point to a second access point and performs re-authentication, the mobile node receives a second session key for secure communication from the authentication server by using a third private key generated with authentication information generated during previous authentication and shared with the authentication server and the second access point receives the second session key from the authentication server by using the second private key previously shared with the authentication server.

25 Claims, 7 Drawing Sheets

AUTHENTICATION METHOD FOR FAST HANDOVER IN A WIRELESS LOCAL AREA NETWORK

PRIORITY

This application claims priority under 35 U.S.C. § 119 to an application entitled "Authentication Method for Fast Handover in a Wireless Local Area Network" filed in the Korean Industrial Property Office on Oct. 15, 2002 and assigned Serial No. 2002-62994, the contents of which are incorporated herein by reference.

BACKGROUND OF THE INVENTION

1. Field of the Invention

The present invention relates generally to a wireless local area network, and in particular, to an authentication method for fast handover of a mobile node.

2. Description of the Related Art

A wireless local area network (WLAN) is a data communication system with high flexibility, realized as an alternative or extended version of a wired local area network (LAN). The wireless local area network can wirelessly exchange data with the minimum number of lines, using a radio frequency (RF). Such a wireless local area network enables a so-called mobile network in which a user can enjoy benefits of data communication using simple equipment while on the move.

The wireless local area network is comprised of at least one wireless access point (AP) that services a limited region, hereinafter referred to as "cell". In such a wireless local area network, it is very important to enable a user node or mobile node that travels from cell to cell to continue seamless communication. For that purpose, a procedure for handing over control of the communication from one access point to another access point is required and this procedure is called "handover." Institute of Electrical and Electronics Engineers (IEEE) has defined an inter-access point protocol (IAPP) for communication and handover between access points (see ANSI/IEEE Std. 802.11, Aug. 1999, IEEE Std. 802.11f/D3, January 2002).

For handover, a mobile node must exchange many signaling messages with access points, which, however, undesirably causes time delay and thus a reduction in the quality of a call. Particularly, in the case where the mobile node is assigned a new network identification address, i.e., Internet protocol (IP) address each time it associates with or accesses an access point, a complicated signaling procedure for searching a corresponding access router during handover and registering the assigned address in a home agent is required. Therefore, much research has been conducted on technologies for efficiently performing handover in a wireless communication environment.

The wireless local area network is advantageous in that a user can conveniently use the network without conducting complicated operations such as line installation. In contrast, however, the wireless local area network is disadvantageous in that an unauthorized user can simply access the network. In many cases, if an access point is physically cut off from the outside, the access point connected to a network permits a mobile node, that newly enters its region, to access the network without authentication operation. In the wireless local area network, since it is difficult to limit a signal delivery region in the light of characteristics of a radio signal, a mutual authentication function between a mobile node and an access point must be provided in order to give users different rights to access the network. Therefore, when an organization that requires security, such as a company, wishes to use the wireless local area network, mutual authentication is necessarily required for a mobile node that attempts an access to the network over several access points, by handover.

According to LAPP, when a mobile node in communication accesses a new access point and requests re-association, the new access point is provided with authentication and security information from a previous access point under the control of an authentication server without performing a new authentication procedure with the mobile node. In this case, however, authentication is necessary even for message exchange between access points.

Figure 1:
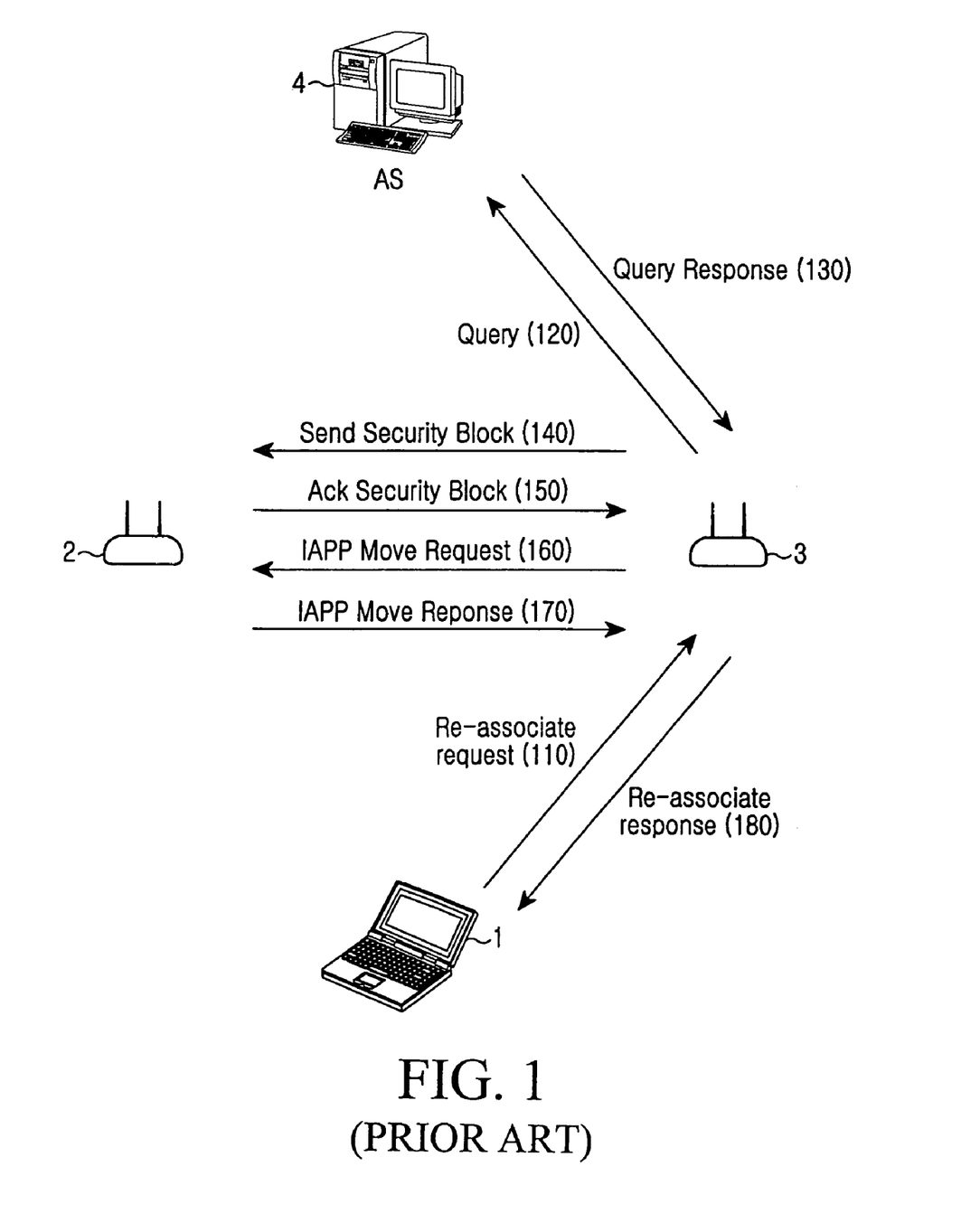
FIG. 1 illustrates a handover and authentication procedure in a wireless local area network according to the prior art.

FIG. 1 illustrates a handover and authentication procedure in a wireless local area network according to the prior art. Referring to FIG. 1, as a mobile node 1 moves from a service area or coverage of a first access point 2 to a service area of a second access point 3, the mobile node 1 sends a Re-associate Request signal to the second access point 3 in step 110. The second access point 3 then sends an authentication server (AS) 4 a Query signal for inquiring about security information for communication with the first access point 2 in step 120. Upon receiving a Query Response signal for the Query signal from the authentication server 4 in step 130, the second access point 3 sends the first access point 2 a Security Block signal for requesting handover in step 140. The first access point 2 then returns or acknowledges the Security Block signal with authentication and security-related information used during communication with the mobile node 1 in step 150. Thereafter, if the second access point 3 sends the first access point 2 an IAPP Move Request signal indicating its operation state according to IAPP in step 160 and then receives an IAPP Move Response signal from the first access point 2 in step 170, the second access point 3 sends the mobile node 1 a Re-associate Response signal indicating completion of re-association in step 180.

In the above-stated handover procedure for a wireless local area network, Internet Protocol. Security (IPSec) standard is currently used as an authentication method between access points. The IPSec is especially useful in realizing a virtual private network and remotely accessing the private network by a user. However, for implementation of the IPSec, the access points become complicated in structure, and public key infrastructure (PKI) for authentication between access points is required, which is a disadvantage.

In the case where access points previously share a secret word or secret for authentication between access points, the public key infrastructure may not be required. In this case, however, as the number of access points is increased more and more, a load of maintaining the secret is increased more and more undesirably. That is, when the mobile node passes through n access points, each access point must maintain (n−1) secret. In addition, in this case, an authentication server on the network must manage IPSec security associations each used during data transmission between the access points.

In particular, during handover, the authentication method causes another security problem, authentication and security information used between a previous access point and a mobile node is continuously used even after the handover. Therefore, in order for the mobile node to safely continue communication with the current access point, all of the previous access points must be safe. That is, conventionally, there is high probability that security information will be exposed.

SUMMARY OF THE INVENTION

It is, therefore, an object of the present invention to provide a method for secure communication between a mobile node and an access point (AP) in a wireless local area network (WLAN).

It is another object of the present invention to provide a method for handling authentication of a mobile node in a wireless local area network.

It is further another object of the present invention to provide a method for handling authentication of a mobile node during handover between access points in a wireless local area network.

It is yet another object of the present invention to provide a method for authenticating a mobile node at high speed without communication between access points in a wireless local area network.

To achieve the above and other objects, there is provided a method for authenticating a mobile node in a wireless local area network including at least two access points for setting up wireless association with the mobile node and an authentication server (AS) for authenticating the mobile node. When the mobile node associates with a first access point and performs initial authentication, the mobile node receives a first session key for secure communication from the authentication server by using a first private key generated with a secret previously shared with the authentication server, and the first access point receives the first session key from the authentication server by using a second private key previously shared with the authentication server. When the mobile node is handed over from the first access point to a second access point and performs re-authentication, the mobile node receives a second session key for secure communication from the authentication server by using a third private key generated with authentication information generated during previous authentication and shared with the authentication server, and the second access point receives the second session key from the authentication server by using the second private key previously shared with the authentication server.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
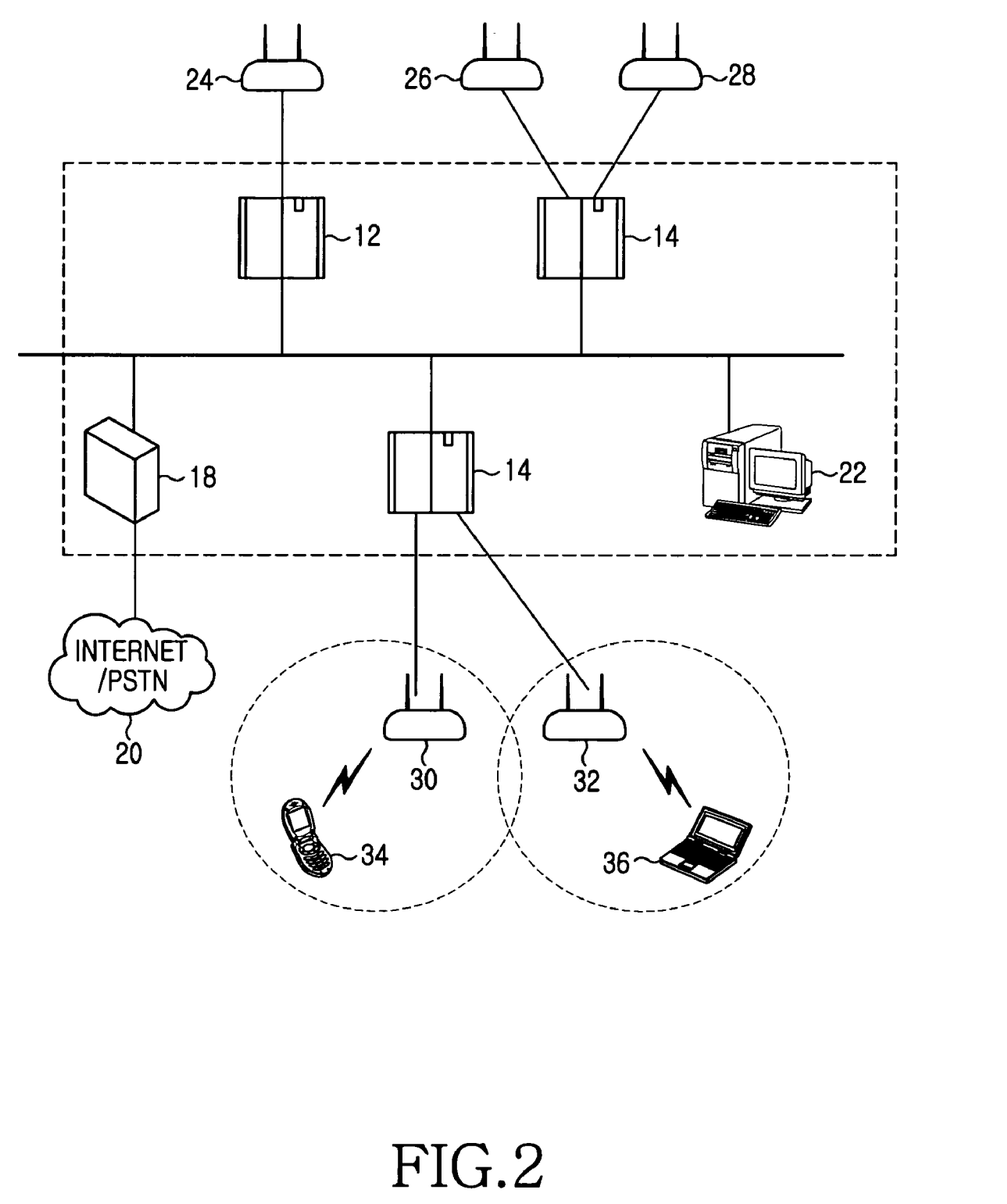
FIG. 2 illustrates an example of a wireless local area network according to an embodiment of the present invention.

FIG. 2 illustrates an example of a wireless local area network (WLAN) according to an embodiment of the present invention. Referring to FIG. 2, a wireless local area network 10 includes switches 12, 14 and 16, and a gateway 18 that is connected to an external network 20 such as the Internet or a public switched telephone network (PSTN). The switches 12, 14 and 16 each connect their access points (AP) 24, 26, 28, 30 and 32 that can be wirelessly associated with mobile nodes 34 and 36 to the external network 20.

The mobile nodes 34 and 36 encipher transmission data with a session key acquired in an authentication procedure with an access point, and decipher data received from the access points 24, 26 28, 30 and 32 with the session key. The session key is unique to a relationship between a mobile node and an access point, thereby enabling safe secure communication. An authentication server (AS) 22 accesses the access points 24, 26 28, 30 and 32 through the switches 12, 14 and 16, and handles authentication of the mobile nodes 34 and 36.

Figure 3:
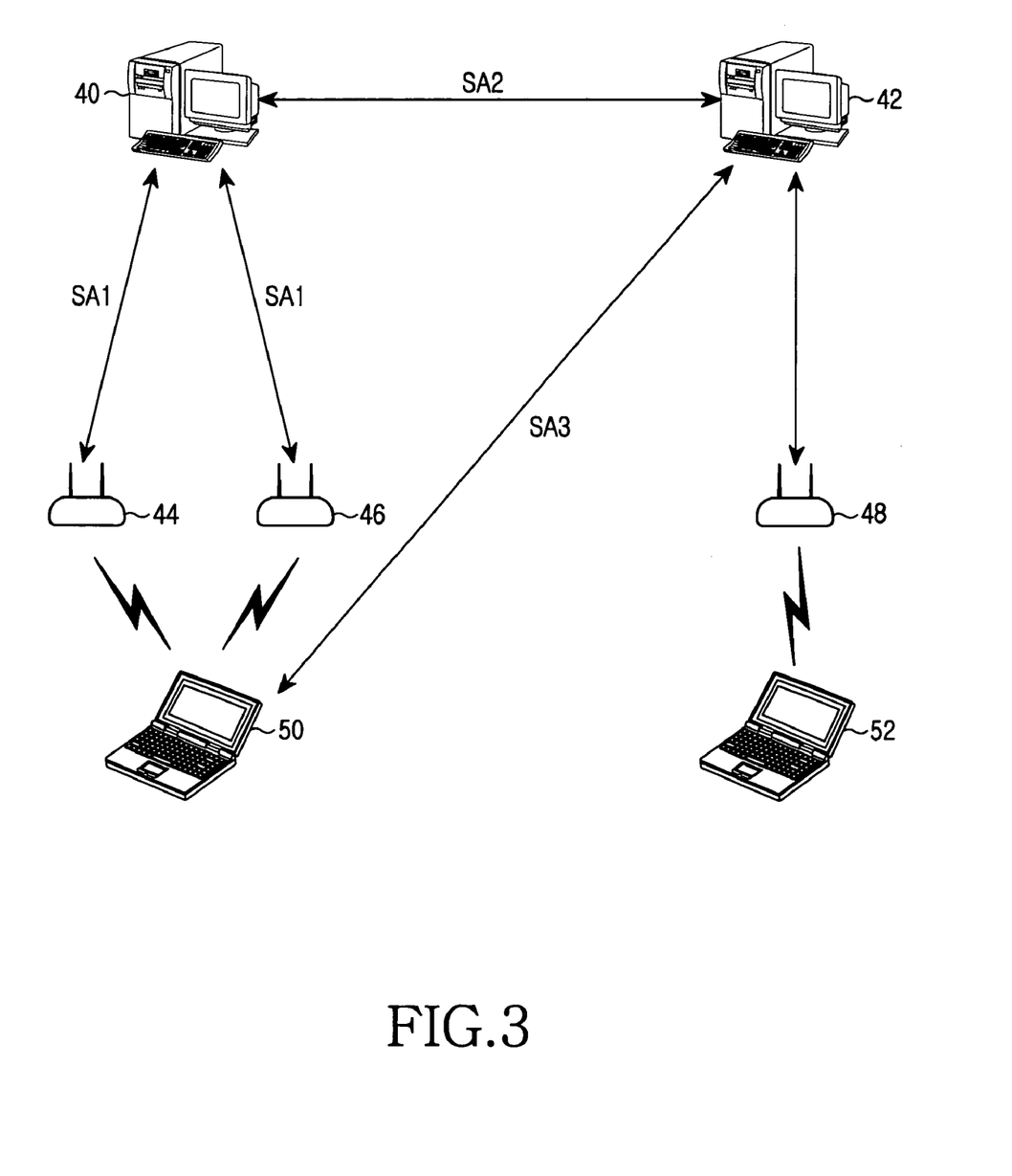
FIG. 3 illustrates an operation of authenticating a mobile node by an authentication server.

FIG. 3 illustrates an operation of authenticating a mobile node by an authentication server. Referring to FIG. 3, a home authentication server (H-AS) 42 can verify credentials provided from its mobile nodes 50 and 52 for mutual authentication between clients. The mobile node 52 accessing the network in a home domain can associate with or access the home authentication server 42 via a corresponding access point 48, and can be directly authenticated by the home authentication server 42.

A foreign authentication server (F-AS) 40 is first accessed when a client accesses the network in a visited domain. If the mobile node 50 that has sent an association request signal does not belong to the foreign authentication server 40, then the foreign authentication server 40 sends an authentication request signal to the home authentication server 42 to which the mobile node 50 belongs, for the mobile node authentication. For this, security association (SA) exists between the home authentication server 42 and the foreign authentication server 40, and the security association is represented by SA2.

If the mobile node 50 associates with an access point 44 or an access point 46 in a visited domain, the access points 44 and 46 hand over a credential provided from the mobile node 50 to the foreign authentication server 40, and the foreign authentication server 40 provides the authentication result received via the SA2 to the mobile node 50 through the access points 44 and 46. At this point, (i) security associations SA1 for mutual authentication between the foreign authentication server 40 and the access points 44 and 46, and (ii) security association SA3 for mutual authentication between the mobile node 50 and the home authentication server 42 after a credential of the mobile node 50 is delivered to the home authentication server 42, are required.

Access points have their own service areas determined by reception strength of radio signals radiated therefrom, and the service areas are called "cells." The cells can partially overlap with each other, and handover occurs in the overlapping region. A principle of handover occurring in a wireless local area network will be described herein below.

All access points periodically broadcast 10 beacon signals per second. A mobile node compares strengths of beacon signals received from neighbor access points, and associates with an access point having the highest signal strength. The access point then transmits information on its identifier and a possible data rate to the mobile node and starts communication.

If a beacon signal from a current access point decreases in strength, a mobile node moving while communicating with the other party determines whether there is any beacon signal having higher strength than a threshold value. If there is any beacon signal having higher strength than the threshold value, the mobile node sends a re-association request signal to a new access point that transmits the beacon signal, in order to be handed over to the new access point. The new access point then transmits necessary information to the mobile node, and starts communication.

In a radio environment where a mobile node roams from place to place, it is necessary to reduce management signals of Layer 2 and Layer 3 and a signaling load needed for mutual authentication between a network and a mobile node, in order to secure continuity of seamless communication. In particular, the present invention relates to reducing a signaling load needed when performing authentication after association between a network and a mobile node.

First, reference will be made to authentication information necessary for the present invention. This information includes:

S: a secret shared by a mobile node and an authentication server

E_k: a symmetrical key cipher algorithm that uses k as a private key between a mobile node and an authentication server $E\_k_{AP}$: a symmetrical key cipher algorithm that uses a private key $k_{AP}$ shared by an access point and an authentication server H(•): a hash function Sk: a session key used for secure communication between a mobile node and an access point TID: a temporary identifier PID: a permanent identifier nonce: a random number generated by a mobile node In describing an authentication operation according to the present invention, it will be assumed that authentication performed with a first access point initially accessed by a mobile node, is defined as initial authentication (i=0, where i represents an index for identifying authentication) and authentication performed with access points accessed thereafter by the mobile node due to handover, is defined as re-authentication (i≠0). In this case, the information necessary for an authentication procedure, $E\_k_{AP}$, H(•) and PID are constant, whereas E_k, Sk, TID and 'nonce' are variable at every authentication.

Although the present invention will be described herein with reference to specific authentication information, the invention performs re-authentication with authentication information used during previous authentication. Therefore, the invention is not restricted by the type or name of the authentication information.

Figure 4:
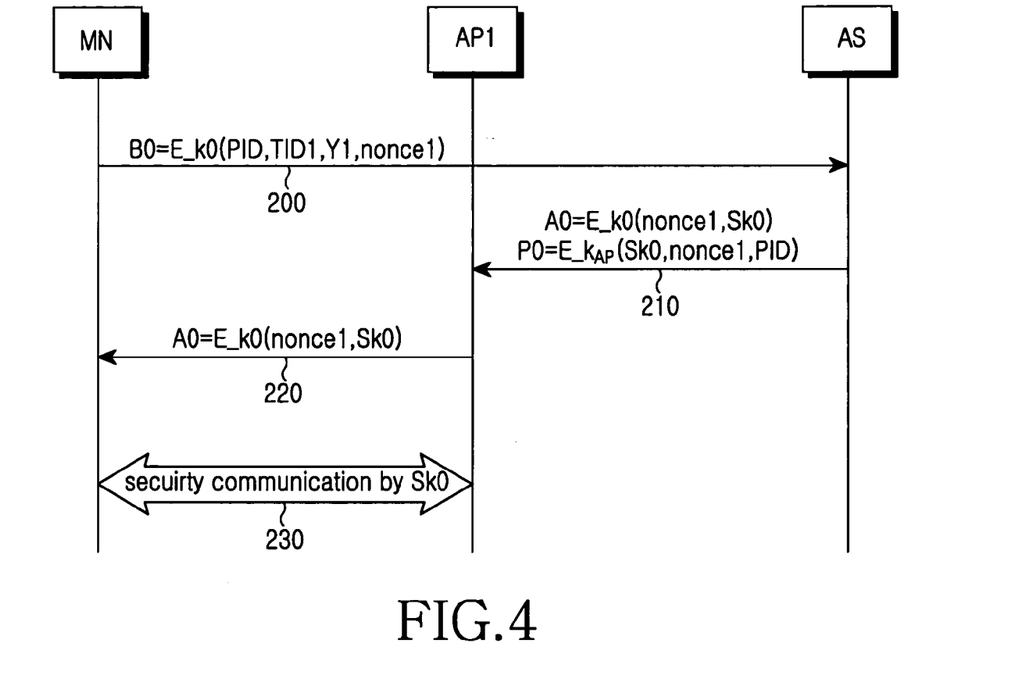
FIG. 4 is a message flow diagram illustrating an operation of performing initial authentication according to an embodiment of the present invention.

FIG. 4 is a message flow diagram illustrating an operation of performing initial authentication according to an embodiment of the present invention. Herein, an authentication server represents a home authentication server to which a mobile node belongs, and if the mobile node is located in a visited domain, an authentication procedure will be performed through a foreign authentication server. Further, an authentication server and access points associated therewith share a private key $k_{AP}$ for mutual communication therebetween.

A mobile node MN sets up wireless association with an access point AP1 first detected after its power on, and then performs pre-authentication with an authentication server AS. The pre-authentication is needed when a mobile node communicates with an authentication server, and can be performed using a password input by a user, bio-information (iris information or fingerprint information) of the user, smart card, etc. Such pre-authentication can be achieved according to a known authentication protocol. The mobile node and the authentication server share a secret S by the pre-authentication. The mobile node and the authentication server acquire a private key k0=H(S) used for message exchange therebetween, using a hash function H that receives the secret S as an input.

After completion of the pre-authentication, the mobile node generates authentication information to be used during the next authentication request, i.e., a temporary identifier TID1, password Y1 and random number nonce1, and then enciphers the generated authentication information with the private key k0, thereby generating an enciphered message B0=E_k0(TID1, Y1, nonce1). The enciphered message B0 is transmitted to the authentication server AS via the access point AP1 in order to request authentication. At this point, a permanent identifier PID of the mobile node can also be transmitted together with the enciphered message B0 in step 200.

After receiving the enciphered message B0, the authentication server AS deciphers the received enciphered message B0 with the private key k0 and stores in a mobile node-related database the temporary identifier TID1 and the password Y1 of the authentication information acquired from the deciphered result. This is done in order to use them during the next authentication. Further, the authentication server AS generates a session key Sk0 to be used for enciphering a data packet from the mobile node and then enciphers the generated session key Sk0 and a random number nonce1 acquired from the enciphered message B0, with the private key k0, thereby generating an enciphered message A0=E_k0(nonce1, Sk0). Since the enciphered message A0 is generated to permit authentication of the mobile node and deliver the session key Sk0. The random number nonce1 can be excluded from the enciphered message A0 when it is desired to reduce the authentication procedure.

Furthermore, the authentication server AS generates an enciphered message $P0=E\_k_{AP}$(Sk0, nonce1, PID) by enciphering the generated session key Sk0. The random number nonce1 acquired from the enciphered message B0 and the permanent identifier PID of the mobile node, with the private key $k_{AP}$ used for communication with access points. The random number nonce1 and the permanent identifier PID can be excluded from the enciphered message P0, if needed. The enciphered message P0 is used to inform an access point of permission of mobile node authentication and to deliver the session key Sk0 to the access point, and all access points accessing the authentication server AS indispensably have the private key $k_{AP}$. The enciphered messages A0 and P0 are transmitted to the access point AP1 in step 210.

The access point AP1 deciphers the enciphered message P0 with the private key $k_{AP}$ shared with the authentication server AS, and stores a permanent identifier PID and a session key Sk0 acquired from the deciphered result. Thereafter, the access point AP1 bypasses the enciphered message A0 to the mobile node in step 220.

The mobile node MN acquires a random number nonce1 and a session key Sk0 by deciphering the enciphered message A0 with the private key k0. If the random number nonce1 acquired from the deciphered result is identical to the random number generated in step 200, the mobile node MN performs secure communication with the session key Sk0, determining that the session key Sk0 acquired from the deciphered result is valid. When it is desired to reduce the authentication procedure, the mobile node MN uses the session key Sk0 instead of comparing random numbers in step 230.

Figure 5:
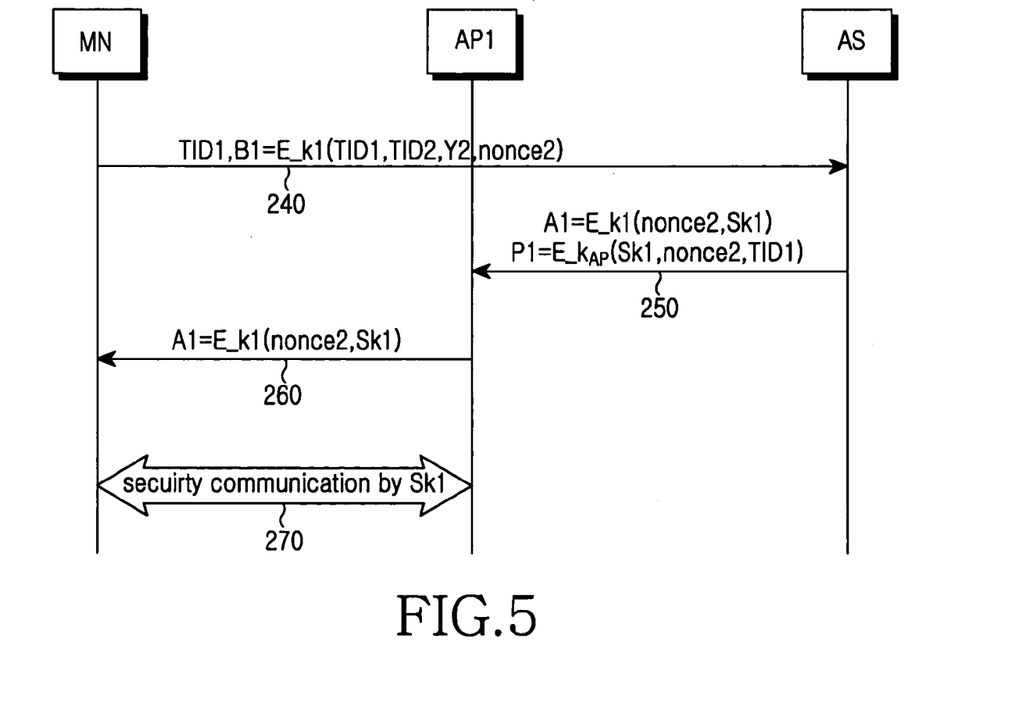
FIG. 5 is a message flow diagram illustrating an operation of performing re-authentication according to an embodiment of the present invention.

FIG. 5 is a message flow diagram illustrating an operation of performing re-authentication according to an embodiment of the present invention, in the case where a mobile node attempts re-association with a new access point due to handover after initial association. Likewise, it will be assumed herein that the mobile node directly performs an authentication procedure with a home authentication server in a home domain, and an authentication server and access points associated therewith share a private key $k_{AP}$ for mutual communication therebetween.

As a mobile node MN accesses a second access point AP2 due to handover, the mobile node MN acquires a private key k1=H(Y1) used for message exchange with an authentication server by using a password Y1 generated during authentication with a previous access point A1 as an input of a hash function. Further, the mobile node MN generates authentication information to be used during the next authentication request, i.e., a temporary identifier TID2, password Y2 and random number nonce2, and then enciphers the generated authentication information together with the temporary identifier TID1 generated during the previous authentication, using the private key k 1, thereby to generate an enciphered message B1=E_k1(TID1, TID2, Y2, nonce2). The enciphered message B1 is transmitted to the authentication server AS via the access point AP2 along with the temporary identifier TID1. When necessary, the non-enciphered previous temporary identifier TID can be transmitted together with the enciphered message B1 in step 240.

After receiving the enciphered message B1, the authentication server AS acquires a private key k1=H(Y1) used for message exchange with a mobile node by using the password Y1 received during the previous authentication as an input of a hash function. The authentication server AS deciphers the received enciphered message B1 with the private key k1 and stores in a mobile node-related database the temporary identifier TID2 and the password Y2 of the authentication information acquired from the deciphered result.

Further, the authentication server AS generates a session key Sk1 to be used for enciphering a data packet from the mobile node, and then enciphers the generated session key Sk1 and the random number nonce2 acquired from the enciphered message B1, with the private key k1, thereby to generate an enciphered message A1=E_k1(nonce2, Sk1). The enciphered message A1 may not include the random number nonce2. In addition, the authentication server AS generates an enciphered message P1=E_$k_{AP}$(Sk1, nonce2, TID1) by enciphering the generated session key Sk1, the random number nonce2 acquired from the enciphered message B1 and the previous temporary identifier TID1, using the private key $k_{AP}$ used for communication with access points. In other cases, the enciphered message P1 does not include the random number nonce2 and the previous temporary identifier TID1. The enciphered messages A1 and P1 are transmitted to the access point AP2 in step 250.

The access point AP2 deciphers the enciphered message P1 with the private key $k_{AP}$ shared with the authentication server AS, and stores a temporary identifier TID2 of the mobile node and a session key Sk1 acquired from the deciphered result. Thereafter, the access point AP2 bypasses the enciphered message A1 to the mobile node in step 260.

The mobile node MN acquires a random number nonce2 and a session key Sk1 by deciphering the enciphered message A1 with the private key k1. If the random number nonce2 acquired from the deciphered result is identical to the random number generated in step 240, the mobile node MN performs secure communication with the session key Sk1, determining that the session key Sk1 acquired from the deciphered result is valid. When it is desired to reduce the authentication procedure, the mobile node MN uses the session key Sk1 instead of comparing random numbers in step 270.

Even in the case where the mobile node is continuously handed over to third and fourth access points, authentication is accomplished in the same procedure as described above. By doing so, access points acquire a session key necessary for data communication with a mobile node, without a burden of performing authentication with another access point.

Figure 6:
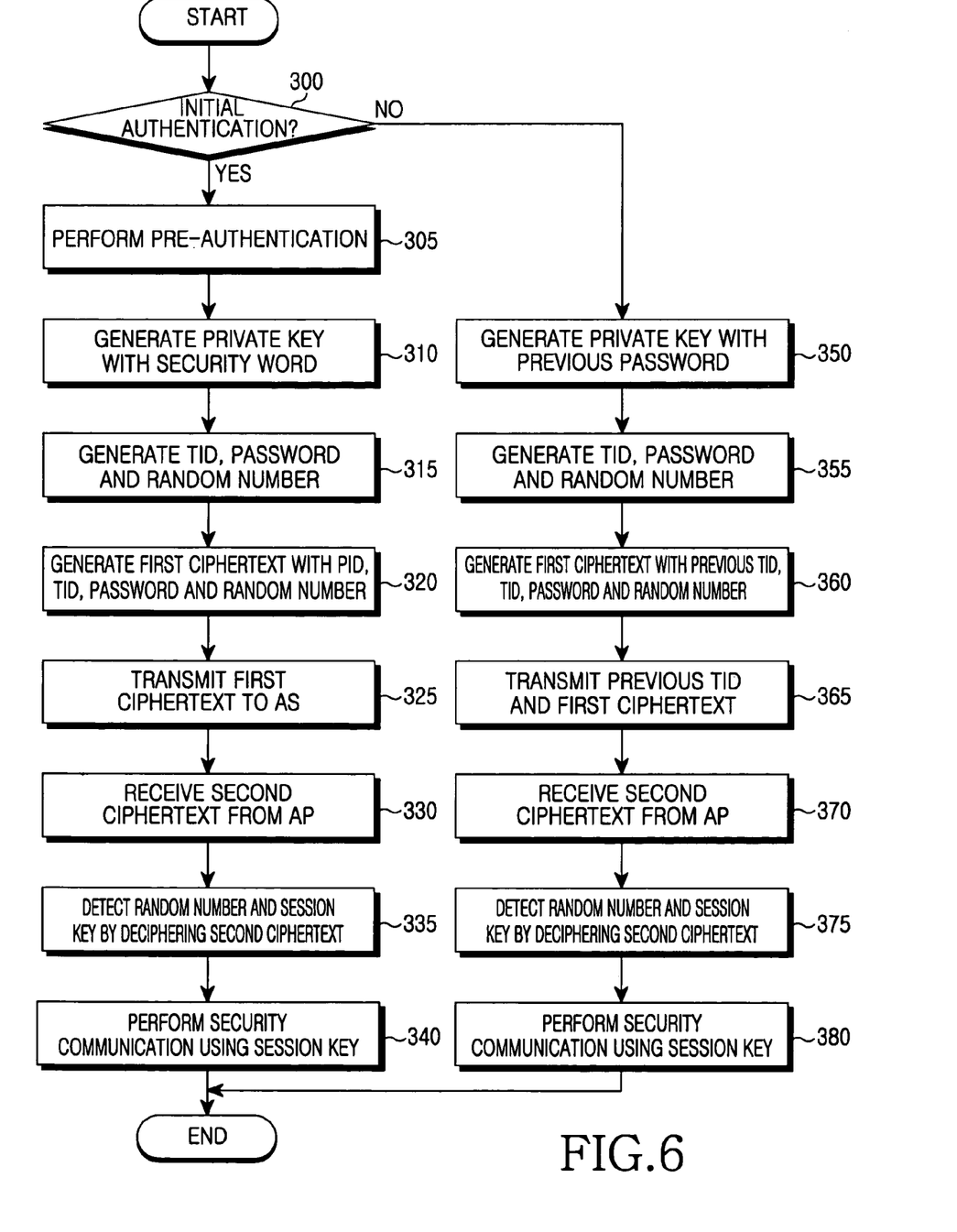
FIG. 6 is a flowchart illustrating an operation of performing authentication by a mobile node according to an embodiment of the present invention.
Figure 7:
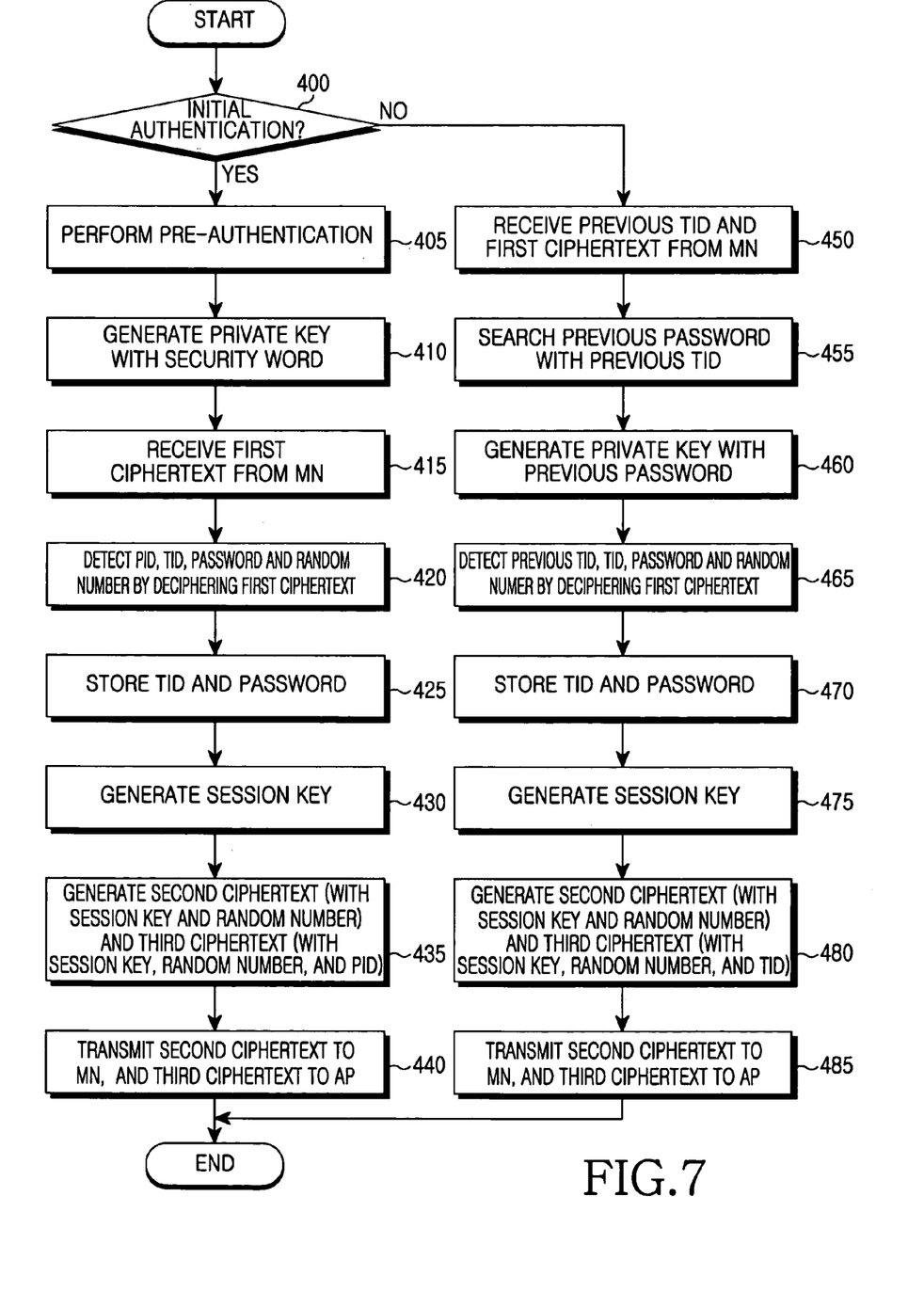
FIG. 7 is a flowchart illustrating an operation of performing authentication by an authentication server according to an embodiment of the present invention.
Figure 8:
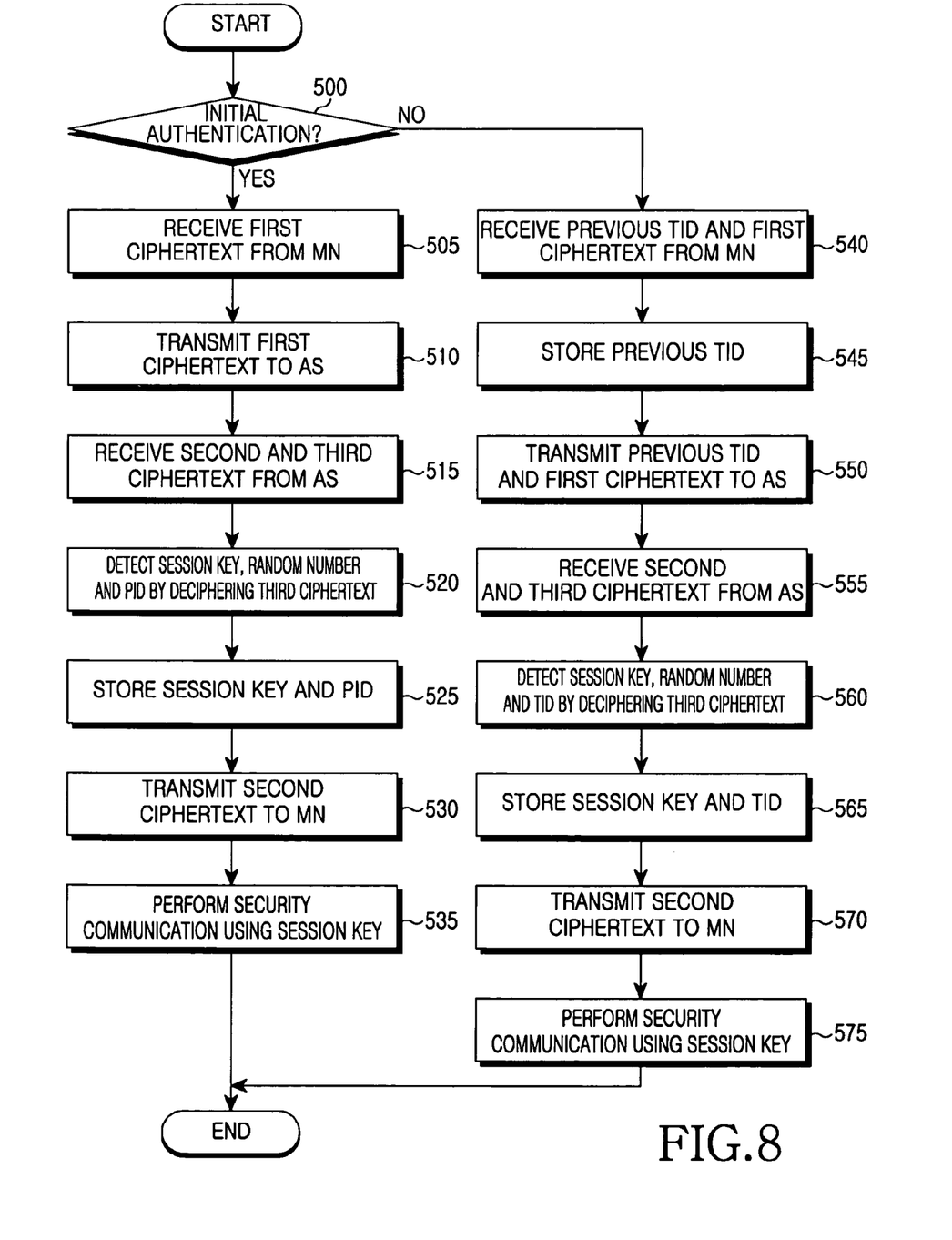
FIG. 8 is a flowchart illustrating an operation of performing authentication by an access point according to an embodiment of the present invention.

FIG. 6 is a flowchart illustrating an operation of performing authentication by a mobile node according to an embodiment of the present invention, FIG. 7 is a flowchart illustrating an operation of performing authentication by an authentication server according to an embodiment of the present invention, and FIG. 8 is a flowchart illustrating an operation of performing authentication by an access point according to an embodiment of the present invention. An operation of performing authentication at each node will now be described with reference to FIGS. 6 to 8.

Referring to FIG. 6, when initially setting up association with an access point in step 300, a mobile node performs pre-authentication according to a known authentication protocol thereby to acquire a secret S shared with an authentication server in step 305. The mobile node calculates a private key k0=H(S), an output of a hash function, using the secret S in step 310, and then generates authentication information to be used during the next authentication request, i.e., temporary identifier TID1, password Y1 and random number nonce1 in step 315. The generated authentication information is stored to be used during the next authentication.

The temporary identifier TID1, password Y1 and random number nonce1 are enciphered together with a permanent identifier PID of the mobile node using the private key k0, thereby generating a first cipher text B0 in step 320. The mobile node transmits the first cipher text B0 to an authentication server via an access point with witch the mobile node is associated in step 325.

If a second cipher text A0 is received from the authentication server via the access point in step 330, the mobile node detects a random number nonce1 and a session key Sk0 by deciphering the second cipher text A0 with the private key k0 in step 335. If the detected random number nonce1 is identical to the random number generated in step 315, the mobile node enciphers data to be transmitted to the access point with the session key Sk0, and deciphers data received from the access point with the session key Sk0 in step 340.

However, if the mobile node is handed over from a previous $(i-1)^{th}$ access point to a new $i^{th}$ access point in step 300, the mobile node calculates a private key $k(i)=H(Y(i))$, an output of a hash function, using a previous password $Y(i)$ generated and stored during previous authentication in step 350, and then generates again authentication information to be used during the next authentication request, i.e., temporary identifier TID(i+1), password Y(i+1) and random number nonce(i+1) in step 355. Likewise, the generated authentication information is stored to be used during the next authentication.

The temporary identifier TID(i+1), password Y(i+1) and random number nonce(i+1) are enciphered together with a temporary identifier TID(i) generated and stored during previous authentication, using the private key k(i), thereby generating a first cipher text B(i) in step 360. The mobile node transmits the first cipher text B(i) to an authentication server via the new access point in step 365.

Thereafter, if a second cipher text A(i) is received from the authentication server via the new access point in step 370, the mobile node detects a random number nonce(i+1) and a session key Sk(i) by deciphering the second cipher text A(i) with the private key k(i) in step 375. If the detected random number nonce(i+1) is identical to the random number nonce(i+1) generated in step 355, the mobile node enciphers data to be transmitted to the new access point with the session key Sk(i), and deciphers data received from the new access point with the session key Sk(i) in step 380.

Referring to FIG. 7, when a mobile node initially sets up association with an access point in step 400, an authentication server acquires a secret S by performing pre-authentication according to a known authentication protocol in step 405, and calculates a private key k0=H(S), an output of a hash function, using the secret S in step 410. Thereafter, if a first cipher text B0 is received from the mobile node via the access point in step 415, the authentication server detects a permanent identifier PID of the mobile node, a temporary identifier TID1, a password Y1 and a random number nonce1 by deciphering the first cipher text B0 with the private key k0 in step 420. The temporary identifier TID1 and the password Y1 are stored in a mobile node database to be used during the next authentication in step 425.

The authentication server generates a session key Sk0 to be used for data communication with the mobile node in step 430. Thereafter, the authentication server generates a second cipher text A0 by enciphering the generated session key Sk0 together with the detected random number nonce1 using the private key k0, and generates a third cipher text P0 by enciphering the generated session key Sk0 together with the detected random number nonce1 and a permanent identifier PID of the mobile node, using a private key $k_{AP}$ previously stored for communication with an access point in step 435. The second cipher text A0 and the third cipher text P0 are transmitted to the access point in step 440.

However, if the mobile node is handed over from a previous $(i-1)^{th}$ access point to a new $i^{th}$ access point in step 400, the authentication server receives a first cipher text B(i) from the mobile node together with a previous temporary identifier TID(i) in step 450. The authentication server searches a mobile node database with the previous temporary identifier TID(I) thereby to acquire a corresponding previous password Y(i) in step 455, and then calculates a private key k(i)=H(Y(i)), an output of a hash function, using the previous password Y(i) (Step 460). The authentication server detects a previous temporary identifier TID(i), a temporary identifier TID(i+1), a password Y(i+1) and a random number nonce(i+1) by deciphering the first cipher text B(i) with the private key k(i) in step 465. The detected temporary identifier TID(i+1) and password Y(i+1) are stored in a mobile node database to be used during the next authentication in step 470.

The authentication server generates a session key Sk(i) to be used for data communication with the mobile node in step 475. Thereafter, the authentication server generates a second cipher text A(i) by enciphering the generated session key Sk(i+1) together with the detected random number nonce (i+1), using the private key k(i), and generates a third cipher text P(i) by enciphering the generated session key Sk(i) together with the detected random number nonce(i+1) and the previous temporary identifier TID(i), using a private key $k_{AP}$ previously stored for communication with an access point in step 480. The second cipher text A(i) and the third cipher text P(i) are transmitted to the new access point in step 485.

Referring to FIG. 8, when a mobile node initially sets up association with an access point in step 500, the access point receives a first cipher text B0 from the mobile node in step 505 and delivers the received first cipher text B0 to an authentication server in step 510. Thereafter, if a second cipher text A0 and a third cipher text P0 are received from the authentication server in step 515, the access point detects a session key Sk0, a random number nonce1 and a permanent identifier PID by deciphering the third cipher text P0 with a private key $k_{AP}$ previously stored for communication with the authentication server in step 520).

The detected session key Sk0 and permanent identifier PID are stored to be used for data communication in step 525. The access point delivers the second cipher text A0 to the mobile node in step 530. Thereafter, the access point enciphers data to be transmitted to the mobile node with the session key Sk0 and deciphers data received from the mobile node with the session key Sk0 in step 535.

However, if the mobile node is handed over from a previous $(i-1)^{th}$ access point to a new $i^{th}$ access point in step 500, the new access point receives a first cipher text B(i) together with a previous temporary identifier TID(i) from the mobile node in step 540. The previous temporary identifier TID(i) is stored in the new access point and then delivered to the authentication server along with the first cipher text B(i) in step 545. Thereafter, if a second cipher text A(i) and a third cipher text P(i) are received from the authentication server in step 550, the access point detects a session key Sk(i), a random number nonce(i+1) and a temporary identifier TID(i+1) by deciphering the third cipher text P(i) with a private key $k_{AP}$ previously stored for communication with the authentication server in step 555.

The detected session key Sk(i) and temporary identifier TID(i+1) are stored to be used for data communication in step 560. The new access point delivers the second cipher text A(i) to the mobile node in step 570. Thereafter, the new access point enciphers data to be transmitted to the mobile node with the session key Sk(i) and deciphers data received from the mobile node with the session key Sk(i) in step 575.

As described above, the present invention has the following advantages. In a wireless local area network, when a mobile node changes an access point due to handover, the present invention provides a key capable of performing secure communication between the mobile node and an access point by simply and rapidly handling a mutual authentication function. In addition, since security association between a previous access point with which the mobile node previously communicated and a current access point with which the mobile node currently communicates before handover is independent from security association between the previous access point and the current access point after handover, the present invention guarantees safety of a current communication session even though any one of previous access points is attacked by a hacker while the mobile node moves. Therefore, security association between access points is not required, resulting in an increase in safety of security information of each session.

In addition, since only the messages needed during mutual authentication through an access point are exchanged after the mobile node moves, an amount of signaling needed during authentication is effectively reduced. Furthermore, when the mobile node requests authentication after moving from one access point to another access point, the mobile node uses a temporary identifier. As a result, it is possible to protect an identifier of the mobile node from a third party such as a hacker or another access point.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for authenticating a mobile node in a wireless local area network including at least two access points for setting up wireless association between the mobile node and an authentication server for authenticating the mobile node, the method comprising the steps of:
   (a) when the mobile node associates with a first access point and performs initial authentication, receiving, by the mobile node, a first session key for secure communication from the authentication server by using a first private key generated with a secret previously shared with the authentication server, and receiving, by the first access point, the first session key from the authentication server by using a second private key previously shared with the authentication server; and
   (b) when the mobile node is handed over from the first access point to a second access point and performs re-authentication, receiving, by the mobile node, a second session key for secure communication from the authentication server by using a third private key generated with authentication information generated during previous authentication and shared with the authentication server, and receiving, by the second access point, the second session key from the authentication server by using the second private key previously shared with the authentication server.

2. The method of claim 1, wherein step (a) comprises the steps of:
   generating the first private key with the secret previously shared by the mobile node and the authentication server;
   generating, by the mobile node, first authentication information to be used during next authentication request and transmitting a first enciphered message generated by enciphering the first authentication information with the first private key to the authentication server;
   storing, by the authentication server, the first authentication information acquired by deciphering the first enciphered message with the first private key and generating the first session key for secure communication;
   transmitting, by the authentication server, a second enciphered message generated by enciphering the first session key and the first authentication information with the first private key to the mobile node, and transmitting a third enciphered message generated by enciphering the first session key and the first authentication information with the second private key previously shared with the first access point, to the first access point;
   acquiring, by the first access point, the first session key by deciphering the third enciphered message with the second private key, and acquiring, by the mobile node, the first session key by deciphering the second enciphered message with the first private key; and
   performing secure communication by the mobile node and the first access point by using the first session key.

3. The method of claim 2, wherein the first authentication information includes a temporary identifier of the mobile node, a password for generating a private key to be used during next authentication, and a random number.

4. The method of claim 3, wherein the first enciphered message includes a permanent identifier of the mobile node and the first authentication information.

5. The method of claim 3, wherein the second enciphered message includes the first session key, a permanent identifier of the mobile node, and the random number.

6. The method of claim 3, wherein the third enciphered message includes the first session key and the random number.

7. The method of claim 1, wherein step (b) comprises the steps of:
   generating, by the mobile node and the authentication server, the third private key with the first authentication information generated by the mobile node during previous authentication;
   generating, by the mobile node, second authentication information to be used during next authentication request, and transmitting a fourth enciphered message generated by enciphering the second authentication information with the third private key to the authentication server;
   storing, by the authentication server, the second authentication information acquired by deciphering the fourth enciphered message with the third private key and generating the second session key for secure communication;
   transmitting, by the authentication server, a fifth enciphered message generated by enciphering the second session key and the authentication information with the third private key to the mobile node, and transmitting a sixth enciphered message generated by enciphering the first session key and the authentication information with the second private key previously shared with the second access point to the second access point;
   acquiring, by the second access point, the second session key by deciphering the sixth enciphered message with the second private key, and acquiring, by the mobile node, the second session key by deciphering the fifth enciphered message with the third private key; and
   performing secure communication by the mobile node and the second access point by using the second session key.

8. The method of claim 7, wherein the second authentication information includes a temporary identifier of the mobile node, a password for generating a private key to be used during next authentication, and a random number.

9. The method of claim 8, wherein the fourth enciphered message includes a previous temporary identifier of the mobile node and the second authentication information.

10. The method of claim 8, wherein the fifth enciphered message includes the second session key and the random number.

11. The method of claim 8, wherein the sixth enciphered message includes the second session key, the random number, and the temporary identifier of the mobile node.

12. A method for performing authentication by a mobile node in a wireless local area network including at least two access points for setting up wireless association with the mobile node and an authentication server for authenticating the mobile node, the method comprising the steps of:

when associating with a first access point and performing initial authentication, generating a first private key with a secret previously shared with the authentication server;

generating first authentication information to be used during next authentication request, and transmitting a first enciphered message generated by enciphering the first authentication information with the first private key to the authentication server;

upon receiving a second enciphered message from the authentication server in response to the first enciphered message, acquiring a first session key by deciphering the second enciphered message with the first private key;

performing secure communication with the first access point by using the first session key;

when being handed over from the first access point to a second access point and performing re-authentication, generating a second private key with the first authentication information generated during previous authentication;

generating second authentication information to be used during a next authentication request, and transmitting a third enciphered message generatedby enciphering the second authentication information with the second private key to the authentication server;

upon receiving a fourth enciphered message from the authentication server in response to the third enciphered message, acquiring a second session key by deciphering the third enciphered message with the second private key; and performing secure communication with the second access point by using the second session key.

13. The method of claim 12, wherein the second authentication information includes a temporary identifier of the mobile node, a password for generating a private key to be used during next authentication, and a random number.

14. The method of claim 13, wherein the third enciphered message includes a previous temporary identifier of the mobile node and the second authentication information.

15. The method of claim 13, wherein the fourth enciphered message includes the random number and the second session key.

16. A method for performing authentication of a mobile node by an authentication server in a wireless local area network including at least two access points for setting up wireless association with the mobile node and an authentication server for authenticating the mobile node, the method comprising the steps of:

when the mobile node associates with a first access point and performs initial authentication, generating a first private key with a secret previously shared with the mobile node;

upon receiving a first enciphered message from the mobile node, acquiring first authentication information to be used during next authentication by deciphering the first enciphered message with the first private key;

generating a first session key for secure communication of the mobile node;

generating a second enciphered message by enciphering the first session key and the first authentication information with the first private key, and transmitting the second enciphered message to the mobile node; and generating a third enciphered message by enciphering the first session key and the first authentication information with a second private key previously shared with the first access point, and transmitting the third enciphered message to the first access point.

17. The method of claim 16, wherein the first authentication information includes a temporary identifier of the mobile node, a password for generating a private key to be used during next authentication, and a random number.

18. The method of claim 17, wherein the first enciphered message includes a permanent identifier of the mobile node and the first authentication information.

19. The method of claim 17, wherein the second enciphered message includes the random number and the first session key.

20. The method of claim 17, wherein the third enciphered message includes the first session key and the random number.

21. The method of claim 16, further comprising the steps of:

when the mobile node is handed over from the first access point to a second access point and performs re-authentication, generating a third private key with the first authentication information received from the mobile node during previous authentication;

upon receiving a fourth enciphered message from the mobile node, acquiring second authentication information to be used during next authentication by deciphering the fourth enciphered message with the third private key;

generating a second session key for secure communication of the mobile node;

generating a fifth enciphered message by enciphering the second session key and the second authentication information with the third private key and transmitting the fifth enciphered message to the mobile node; and generating a sixth enciphered message by enciphering the second session key and the second authentication information with the second private key previously shared with the second access point, and transmitting the sixth enciphered message to the second access point.

22. The method of claim 21, wherein the second authentication information includes a temporary identifier of the mobile node, a password for generating a private key to be used during next authentication, and a random number.

23. The method of claim 22, wherein the fourth enciphered message includes a permanent identifier of the mobile node and the second authentication information.

24. The method of claim 22, wherein the fifth enciphered message includes the random number and the second session key.

25. The method of claim 22, wherein the sixth enciphered message includes the second session key and the random number.

* * * * *